US011830495B2

(12) United States Patent
Smith et al.

(10) Patent No.: US 11,830,495 B2
(45) Date of Patent: Nov. 28, 2023

(54) NETWORKED DEVICES, SYSTEMS, AND METHODS FOR INTELLIGENTLY DEACTIVATING WAKE-WORD ENGINES

(71) Applicant: Sonos, Inc., Santa Barbara, CA (US)

(72) Inventors: Connor Kristopher Smith, New Hudson, MI (US); Charles Conor Sleith, Waltham, MA (US); Kurt Thomas Soto, Ventura, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/151,619

(22) Filed: Jan. 9, 2023

(65) Prior Publication Data

US 2023/0237998 A1 Jul. 27, 2023

Related U.S. Application Data

(63) Continuation of application No. 17/135,347, filed on Dec. 28, 2020, now Pat. No. 11,551,690, which is a continuation of application No. 16/131,409, filed on Sep. 14, 2018, now Pat. No. 10,878,811.

(51) Int. Cl.

| | |
|---|---|
| ***G10L 15/30*** | (2013.01) |
| ***G10L 15/22*** | (2006.01) |
| ***G10L 15/08*** | (2006.01) |
| *H04L 67/12* | (2022.01) |
| *G10L 25/78* | (2013.01) |
| *G10L 15/04* | (2013.01) |

(52) U.S. Cl.

CPC .............. *G10L 15/22* (2013.01); *G10L 15/08* (2013.01); *G10L 15/30* (2013.01); *G10L 15/04* (2013.01); *G10L 15/083* (2013.01); *G10L 25/78* (2013.01); *G10L 2015/088* (2013.01); *G10L 2015/223* (2013.01); *H04L 67/12* (2013.01)

(58) Field of Classification Search

None

See application file for complete search history.

(56) References Cited

U.S. PATENT DOCUMENTS

| | | | | |
|---|---|---|---|---|
| 6,937,977 B2 * | 8/2005 | Gerson | .................. | G10L 25/78 379/406.01 |
| 7,103,542 B2 * | 9/2006 | Doyle | .................... | G10L 15/01 704/235 |
| 9,098,467 B1 * | 8/2015 | Blanksteen | ............. | G10L 15/22 |
| 9,208,785 B2 * | 12/2015 | Ben-David | ............. | G10L 15/30 |
| 9,354,687 B2 * | 5/2016 | Bansal | .................... | G10L 15/22 |

(Continued)

*Primary Examiner* — Richard Z Zhu

(57) ABSTRACT

In one aspect, a playback deice is configured to identify in an audio stream, via a second wake-word engine, a false wake word for a first wake-word engine that is configured to receive as input sound data based on sound detected by a microphone. The first and second wake-word engines are configured according to different sensitivity levels for false positives of a particular wake word. Based on identifying the false wake word, the playback device is configured to (i) deactivate the first wake-word engine and (ii) cause at least one network microphone device to deactivate a wake-word engine for a particular amount of time. While the first wake-word engine is deactivated, the playback device is configured to cause at least one speaker to output audio based on the audio stream. After a predetermined amount of time has elapsed, the playback device is configured to reactivate the first wake-word engine.

20 Claims, 8 Drawing Sheets

(56) References Cited

U.S. PATENT DOCUMENTS

| | | | | |
|---|---|---|---|---|
| 9,368,105 | B1 * | 6/2016 | Freed | G10L 15/22 |
| 9,632,748 | B2 * | 4/2017 | Faaborg | G06F 3/167 |
| 9,779,725 | B2 * | 10/2017 | Sun | G10L 15/22 |
| 9,818,407 | B1 * | 11/2017 | Secker-Walker | G10L 25/78 |
| 9,899,021 | B1 * | 2/2018 | Vitaladevuni | G10L 15/14 |
| 9,972,343 | B1 * | 5/2018 | Thorson | G10L 15/08 |
| 10,204,624 | B1 * | 2/2019 | Knudson | G10L 15/22 |
| 10,720,173 | B2 * | 7/2020 | Freeman | H04R 3/005 |
| 10,789,041 | B2 * | 9/2020 | Kim | G06F 3/165 |
| 10,825,471 | B2 * | 11/2020 | Walley | G10L 15/22 |
| 10,837,667 | B2 * | 11/2020 | Nelson | G05D 23/1902 |
| 2007/0201639 | A1 * | 8/2007 | Park | G10L 15/30<br>704/E15.047 |
| 2013/0339028 | A1 * | 12/2013 | Rosner | G10L 15/22<br>704/E11.001 |
| 2014/0006825 | A1 * | 1/2014 | Shenhav | G06F 1/3206<br>713/323 |
| 2014/0214429 | A1 * | 7/2014 | Pantel | G10L 15/22<br>704/275 |
| 2014/0274203 | A1 * | 9/2014 | Ganong, III | G10L 15/02<br>455/563 |
| 2014/0363022 | A1 * | 12/2014 | Dizon | H04N 21/43615<br>381/105 |
| 2016/0077794 | A1 * | 3/2016 | Kim | G10L 15/20<br>704/275 |
| 2016/0171976 | A1 * | 6/2016 | Sun | H04W 52/0251<br>704/254 |
| 2016/0322045 | A1 * | 11/2016 | Hatfield | G10L 21/0216 |
| 2018/0061396 | A1 * | 3/2018 | Srinivasan | G10L 15/08 |
| 2019/0206412 | A1 * | 7/2019 | Li | G10L 17/00 |
| 2019/0259408 | A1 * | 8/2019 | Freeman | G10L 21/0232 |

* cited by examiner

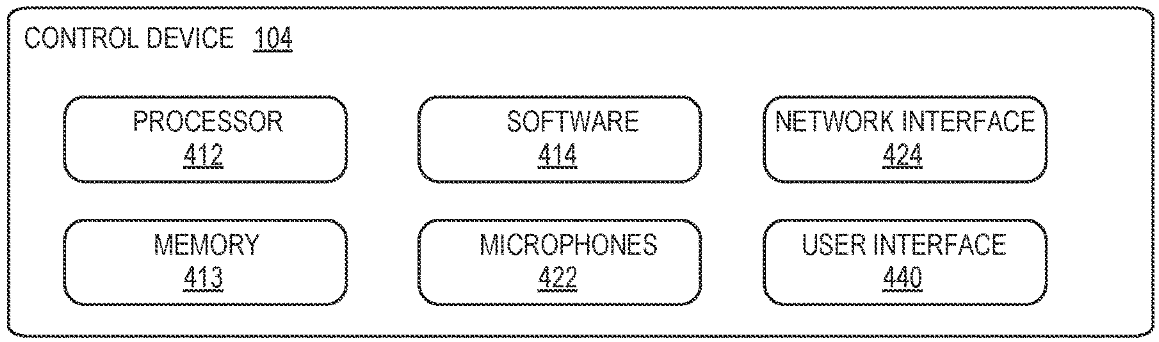
Figure 4A
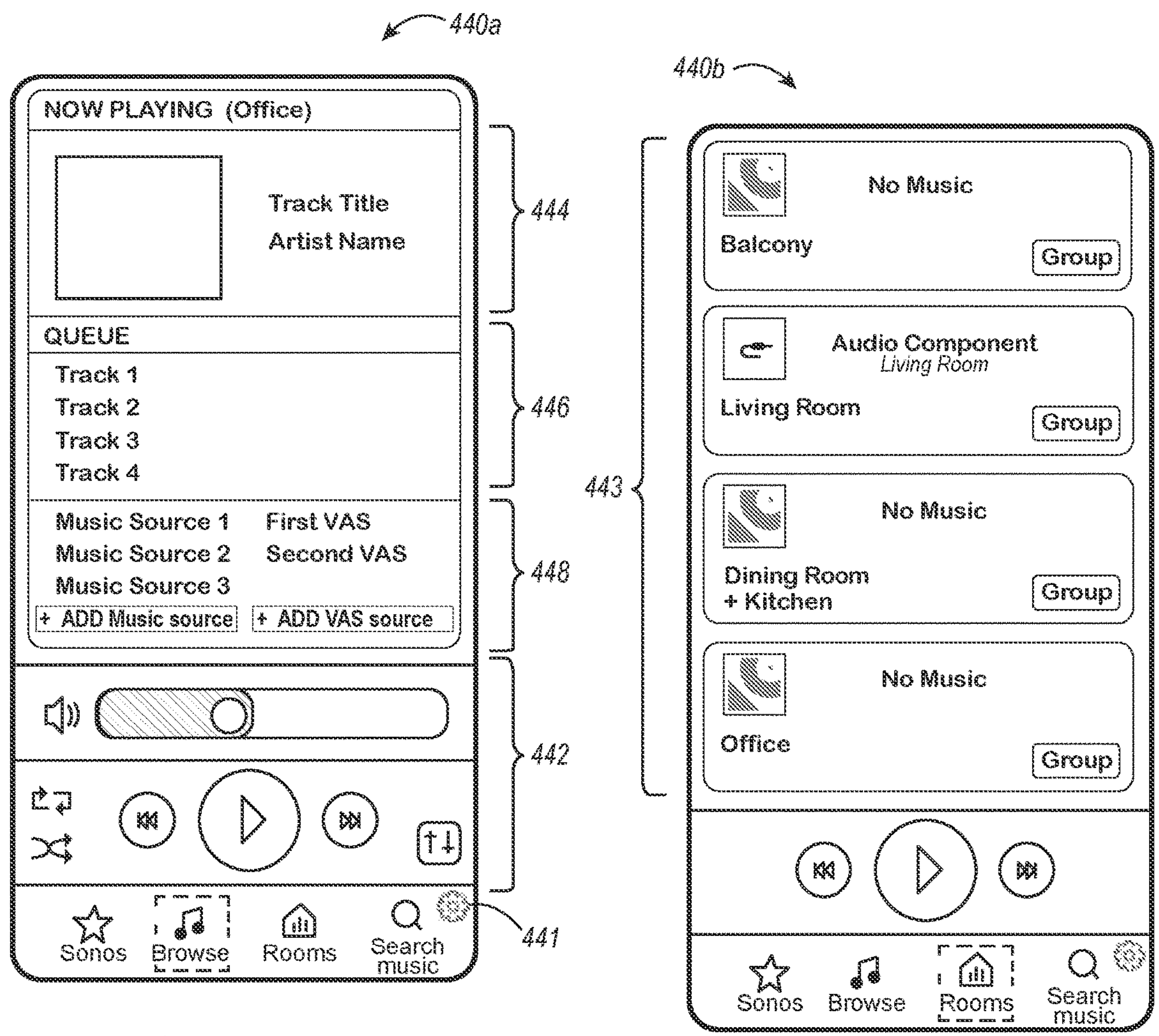
Figure 4B
Figure 4C

NETWORKED DEVICES, SYSTEMS, AND METHODS FOR INTELLIGENTLY DEACTIVATING WAKE-WORD ENGINES

CROSS REFERENCE TO RELATED APPLICATIONS

The present application is a continuation of U.S. application Ser. No. 17/135,347, filed Dec. 28, 2020, and titled "Networked Devices, Systems, & Methods for Intelligently Deactivating Wake-Word Engines," which is a continuation of U.S. application Ser. No. 16/131,409, now U.S. Pat. No. 10,878,811, filed Sep. 14, 2018, and titled "Networked Devices, Systems, & Methods for Intelligently Deactivating Wake-Word Engines," the contents of each of which are explicitly incorporated by reference herein in their entirety.

TECHNICAL FIELD

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 4A is a functional block diagram of an example controller device in accordance with aspects of the disclosure;

FIGS. 4B and 4C are controller interfaces in accordance with aspects of the disclosure;

Figure 1A:
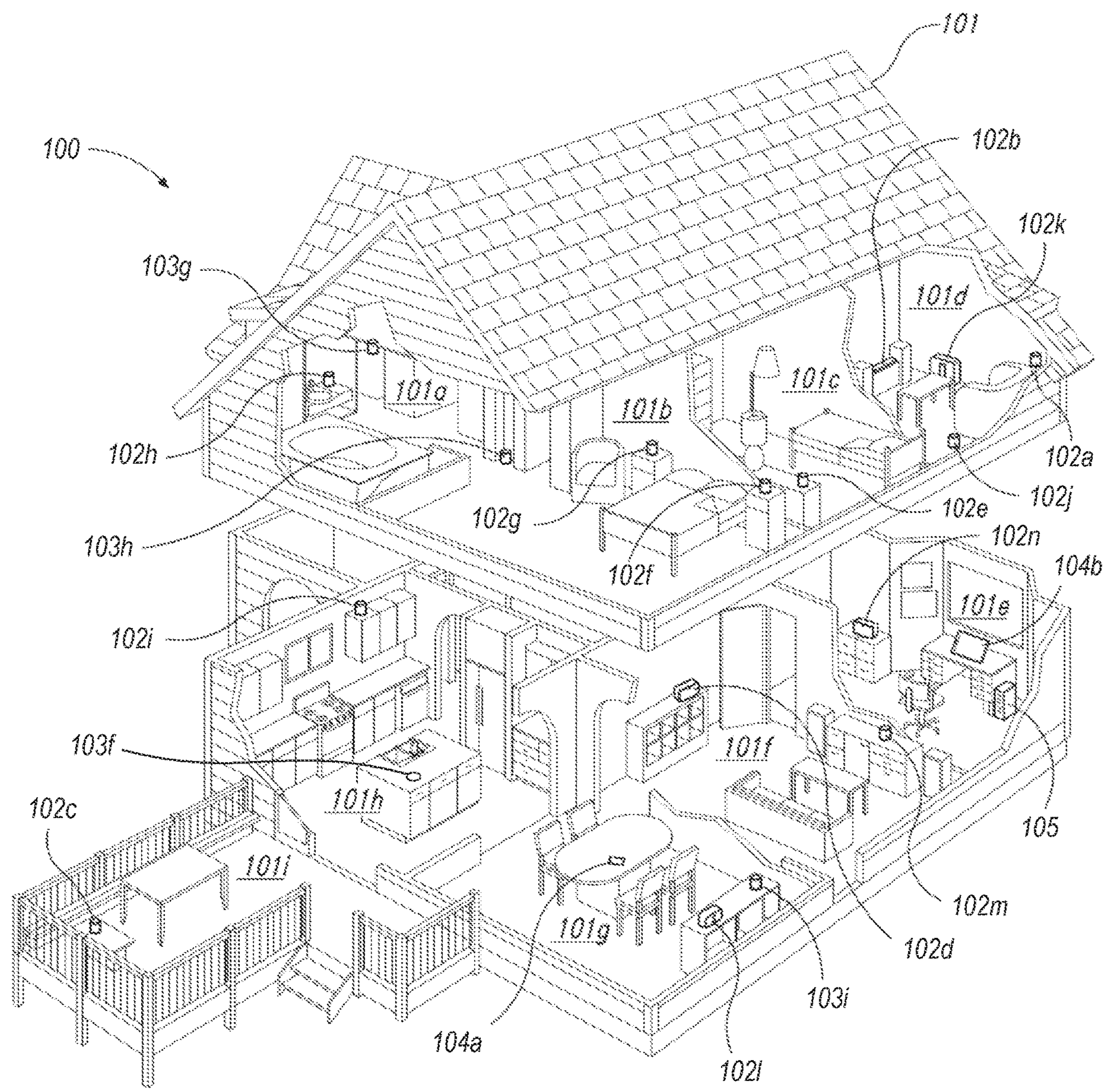
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103*a* is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). In some implementations, network microphone devices may be used to control smart home devices.

A network microphone device ("NMD") is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

A voice input will typically include a wake word followed by an utterance comprising a user request. In practice, a wake word is typically a predetermined word or phrase used to "wake up" an NMD and cause it to invoke a particular voice assistant service ("VAS") to interpret the intent of voice input in detected sound. For example, a user might speak the wake word "Alexa" to invoke the AMAZON VAS, "Ok, Google" to invoke the GOOGLE VAS, "Hey, Siri" to invoke the APPLE VAS, or "Hey, Sonos" to invoke a VAS offered by SONOS, among other examples. In practice, a wake word may also be referred to as, for example, an activation-, trigger-, wakeup-word or -phrase, and may take the form of any suitable word, combination of words (e.g., a particular phrase), and/or some other audio cue.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected-sound according to a particular format and transmitting the packaged sound-data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media playback system comprising the NMD such that a voice input or certain types of voice input (e.g., rudimentary commands) are processed locally without intervention from a remote VAS.

In any case, when a VAS receives detected-sound data, the VAS will typically process this data, which involves identifying the voice input and determining an intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

One challenge with some existing NMDs is that they can be prone to false positives caused by "false wake word" triggers. A false positive in the NMD context generally refers to detected sound input that erroneously invokes a VAS. One consequence of a false positive is that the NMD may seek to invoke a VAS, even though there is nobody actually speaking a wake word to the NMD. In practice, a false positive can occur in a variety of manners.

For example, a false positive can occur when a wake-word engine identifies a wake word in detected sound from audio (e.g., music, a podcast, etc.) playing in the environment of the NMD. This output audio may be playing from a playback device in the vicinity of the NMD or by the NMD itself. A word or phrase in output audio that causes a false positive may be referred to herein as a "false wake word." For instance, when the audio of a commercial advertising AMAZON's ALEXA service is output in the vicinity of the NMD, the word "Alexa" is considered a false wake word because it can cause a wake-word trigger to occur at the NMD.

In some instances, a false wake word may be a word that is phonetically similar to an actual wake word. For example, when the audio of a commercial advertising LEXUS automobiles is output in the vicinity of the NMD, the word "Lexus" is considered a false wake word because it can cause a wake-word trigger to occur at the NMD. In some instances, false positives caused by phonetic similarities to wake words may be attributable to the sensitivity level of a wake-word engine. In practice, a wake-word engine may be tuned to a higher sensitivity level to accommodate a wider range of dialectical and speech pattern variations for a given wake word, despite the possibility of this leading to an increase in false positives.

The occurrences of false positives are undesirable for a number of reasons. For example, an NMD prone to false positives can operate inefficiently. For instance, when a wake-word trigger occurs at an NMD due to a false positive, it may wake-up certain voice capture components from a standby (e.g., idle) state to an active state. When this occurs, the voice capture components draw additional power and consume valuable system resources until these components return to their normal standby state. As another example, a false positive may cause an NMD to chime unexpectedly and startle anyone nearby the NMD. As yet another example, a false positive may also interrupt audio playback, which can diminish a listening experience.

Example devices, systems, and methods configured in accordance with embodiments of the disclosure help address these and other challenges associated with false positives in NMDs. In example embodiments, a playback device of a networked media playback system includes components and functionality of an NMD (i.e., the playback device is "NMD-equipped"). In this respect, in addition to including one or more microphones configured to detect sounds present in the playback device's environment, the playback device also includes a first (e.g., "primary") wake-word engine and a second (e.g., "secondary") wake-word engine, which may also be referred to as a "wake-word engine suppressor."

The primary wake-word engine may be configured to identify one or more particular wake words in sound detected by the playback device's one or more microphones in a manner similar to that described above. When the primary wake-word engine identifies a wake word, it may then cause the playback device to determine that a wake-word trigger occurred, resulting in the playback device performing additional actions, as discussed before. In practice, the detected sound that is input to the primary wake-word engine may include audio that was output by the playback device itself.

The wake-word engine suppressor may be configured to identify one or more false wake words in an audio stream that is to be output by the playback device, and when a false wake word is identified, the wake-word engine suppressor may be configured to temporarily deactivate the playback device's primary wake-word engine and cause the playback device to temporarily deactivate the wake-word engines of one or more other NMDs (e.g., one or more NMD-equipped playback devices). In operation, the wake-word engine suppressor may be tuned to be more sensitive at spotting false wake words than the primary wake-word engine. For example, for a primary wake word engine configured to identify the wake word "Alexa," the wake-word engine suppressor may be set to a relatively higher sensitivity level to identify phonetically similar words, such as “Alexis,” “Lexus,” “Election,” etc. In this respect, the wake-word engine suppressor may be set to a greater sensitivity level than the primary wake-word engine under the assumption that potential false wake words would generate false positives at the primary wake-word engine and because the playback device imposes stricter constraints on the primary wake-word engine for keyword spotting in sound detected by the playback device’s microphones.

In practice, the playback device may receive the audio stream that the wake-word engine suppressor analyzes via an audio interface, which may take a variety of forms and may be configured to receive audio from a variety of sources. As one example, the audio interface may take the form of an analog and/or digital line-in receptacle that physically connects the playback device to an audio source, such as a CD player or a TV. As another example, the audio interface may take the form of, or otherwise leverage, a network interface of the playback device that receives audio data via a communication network from a music service (e.g., an Internet streaming music service, an on-demand Internet music service, etc.), another playback device, or a networked storage device, among other examples.

In any case, the wake-word engine suppressor may perform keyword spotting in the audio stream in a manner similar to keyword spotting by the primary wake-word engine, except that the wake-word engine suppressor is configured to identify keywords in the path of the audio stream (i.e., the audio that the playback device is to play-back) rather than the path of detected sound. When the wake-word engine suppressor identifies a false wake word in the audio steam, it may then temporarily deactivate the playback device’s primary wake-word engine, which may occur in various ways.

As one possibility, the wake-word engine suppressor may instruct the playback device to ignore wake-word triggers output by the primary wake-word engine for a predetermined amount of time. As another possibility, the wake-word engine suppressor may instruct the primary wake-word engine not to indicate wake-word triggers for a predetermined amount of time. As yet another possibility, the wake-word engine suppressor may cause the primary wake-word engine to enter a standby state for a predetermined amount of time. As yet a further possibility, the wake-word engine suppressor may cause the primary wake-word engine to reduce its sensitivity level for a predetermined amount of time. In any case, the primary wake-word engine may return to its normal state after the predetermined amount of time has expired and/or upon instruction from the wake-word engine suppressor, among other possibilities.

Also as a result of the wake-word engine suppressor identifying a false wake word in the audio steam, the playback device may cause one or more other NMDs to temporarily deactivate respective wake-word engines corresponding to the identified false wake word for a certain amount of time, which it may do in a variety of manners. For example, the wake-word engine suppressor may cause the playback device to provide, via a local communication network, an indicator to each NMD that is to have its wake-word engine deactivated.

In some implementations, the playback device may be configured to select which of the other NMDs should deactivate their respective wake-word engines. For example, the playback device may select for deactivation any NMD that it is arranged to play back audio in synchrony with. As another example, the playback device may select for deactivation any NMD that is located within a certain proximity to the playback device. Other examples are also possible. In other implementations, the playback device may be configured to cause any NMD that is part of the same media playback system or that is on the same local communication network as the playback device to deactivate its own wake-word engine.

In any case, each other NMD temporarily deactivates its wake-word engine in response to receiving the indicator. In practice, the one or more other NMDs deactivate their respective wake-word engines in a manner similar to how the playback device deactivated its primary wake-word engine. In this respect, an NMD may deactivate its wake-word engine for a particular amount of time in response to receiving the indicator. In some embodiments, the amount of time that the wake-word engine of an NMD is deactivated is the same as the amount of time that the primary wake-word engine of the playback device is deactivated. In other embodiments, these amounts of time may differ.

While the primary wake-word engine is deactivated (and the one or more other NMDs’ wake-word engines are deactivated), the playback device may cause its speakers to output audio based on the audio stream. In other words, the playback device may play back audio comprising the false wake word that was identified by the wake-word engine suppressor. By suppressing the wake-word engines of the playback and NMD(s), the playback device has prevented, or at least mitigated, the media playback system wasting compute resources, an interruption of audio playback, and/or unexpected chiming that otherwise might be caused by false positives. After the playback device’s deactivation time has elapsed, the playback device may reactivate its primary wake-word engine. With the playback device’s primary wake-word engine reactivated, the playback device returns to analyzing sounds from the playback device’s environment for voice inputs comprising a wake word. Likewise, after the deactivation time of the one or more other NMMs has elapsed, the one or more other NMDs may re-active their respective wake-word engines and return to analyzing sounds for voice inputs comprising a wake word.

In some embodiments, one or more of the other NMDs may also include a wake-word engine suppressor that operates in a manner similar to that of the wake-word engine suppressor of the playback device. In this regard, such an NMD may transmit an indicator to the playback device to deactivate its primary wake-word engine when that NMD determines that it is about to output audio with a false wake word.

While some embodiments described herein may refer to functions performed by given actors, such as “users” and/or other entities, it should be understood that this description is for purposes of explanation only. The claims should not be interpreted to require action by any such example actor unless explicitly required by the language of the claims themselves.

II. Example Operating Environment

Figure 1B:
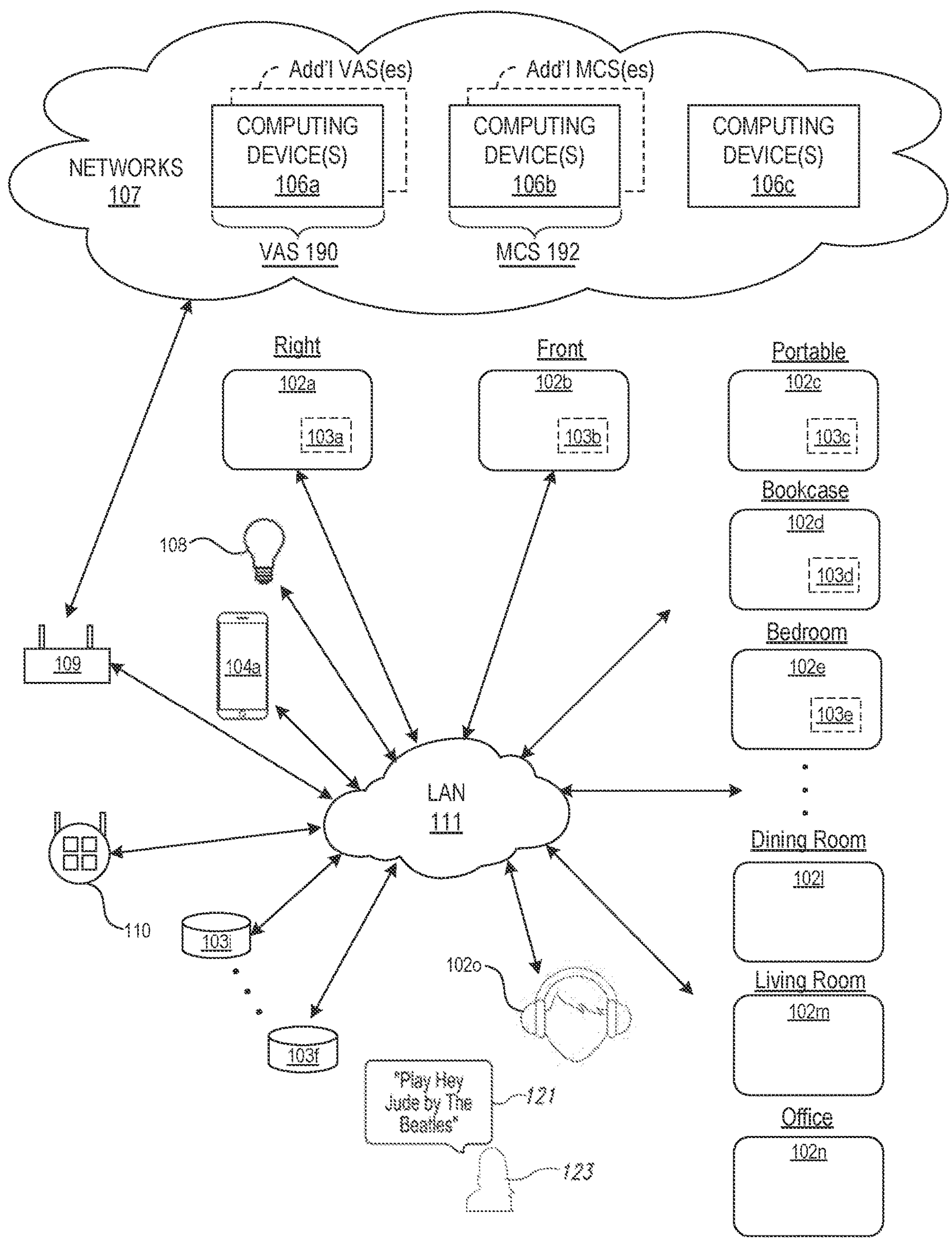
FIG. 1B is a schematic diagram of the media playback system of FIG. 1A and one or more networks.

FIGS. 1A and 1B illustrate an example configuration of a media playback system 100 (or “MPS 100”) in which one or more embodiments disclosed herein may be implemented. Referring first to FIG. 1A, the MPS 100 as shown is associated with an example home environment having a plurality of rooms and spaces, which may be collectively referred to as a “home environment,” “smart home,” or “environment 101.” The environment 101 comprises a household having several rooms, spaces, and/or playback zones, including a master bathroom 101_a_, a master bedroom 101_b_ (referred to herein as "Nick's Room"), a second bedroom 101_c_, a family room or den 101_d_, an office 101_e_, a living room 101_f_, a dining room 101_g_, a kitchen 101_h_, and an outdoor patio 101_i_. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102_a_-102_o_), network microphone devices 103 (identified individually as "NMDs" 103_a_-102_i_), and controller devices 104_a_ and 104_b_ (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102_o_ (FIG. 1B) are a portable playback device, while the playback device 102_d_ on the bookcase may be a stationary device. As another example, the playback device 102_c_ on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102_j_ in the Den 101_d_ (FIG. 1A), which may be designated as the "Left" device, may have a point-to-point connection with the playback device 102_a_, which is also in the Den 101_d_ and may be designated as the "Right" device. In a related embodiment, the Left playback device 102_j_ may communicate with other network devices, such as the playback device 102_b_, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106_a_ are associated with a VAS 190 and remote computing devices 106_b_ are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106_c_ configured to perform certain operations, such as remotely facilitating media playback functions, managing device and system status information, directing communications between the devices of the MPS 100 and one or multiple VASes and/or MCSes, among other operations. In one example, the remote computing devices 106_c_ provide cloud servers for one or more SONOS Wireless HiFi Systems.

In various implementations, one or more of the playback devices 102 may take the form of or include an on-board (e.g., integrated) network microphone device. For example, the playback devices 102_a-e_ include or are otherwise equipped with corresponding NMDs 103_a-e_, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103_f_ and 103_g_ may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102_d_ because it is physically situated on a bookcase. Similarly, the NMD 103_f_ may be assigned the named "Island" because it is physically situated on an island countertop in the Kitchen 101_h_ (FIG. 1A). Some playback devices may be assigned names according to a zone or room, such as the playback devices 102_e_, 102_l_, 102_m_, and 102_n_, which are named "Bedroom," "Dining Room," "Living Room," and "Office," respectively. Further, certain playback devices may have functionally descriptive names. For example, the playback devices 102_a_ and 102_b_ are assigned the names "Right" and "Front," respectively, because these two devices are configured to provide specific audio channels during media playback in the zone of the Den 101_d_ (FIG. 1A). The playback device 102_c_ in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106*a-d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
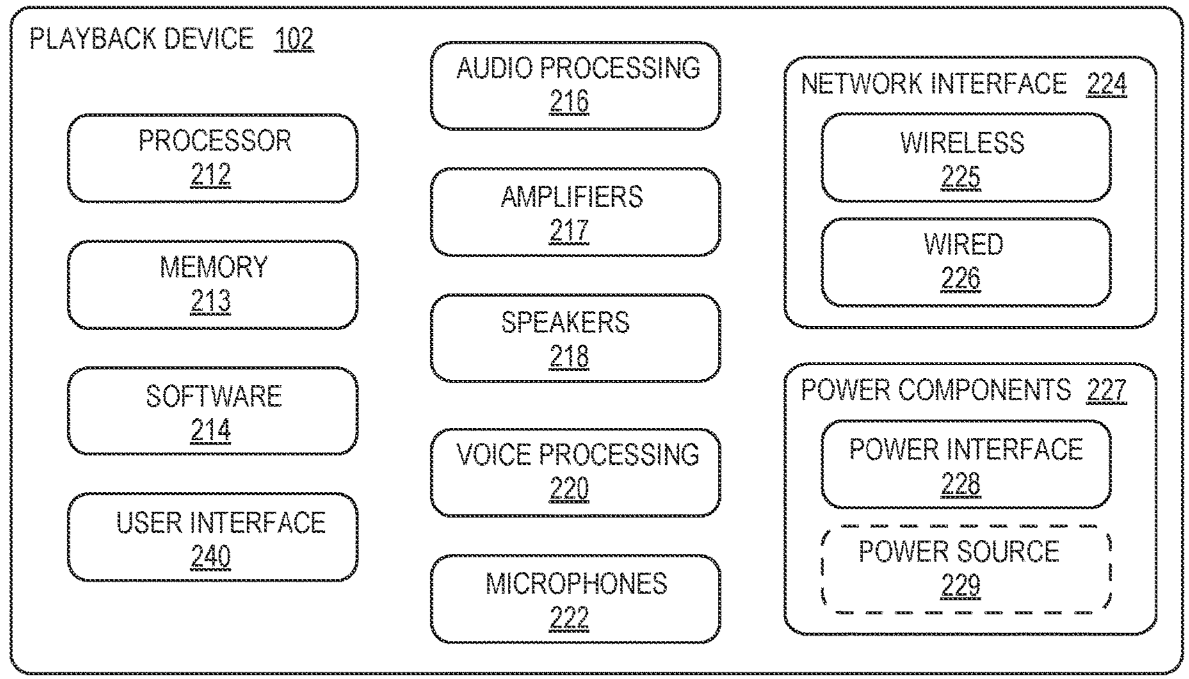
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device (s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
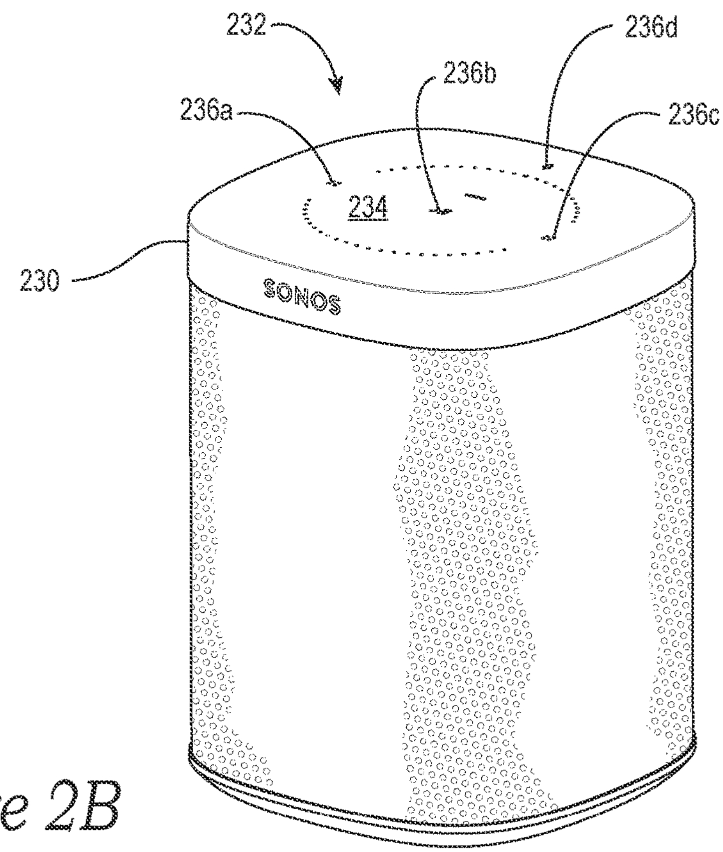
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3B:
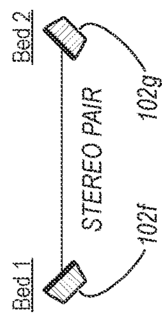
FIGS. 3A-3E are diagrams showing example playback device configurations in accordance with aspects of the disclosure.
Figure 3C:
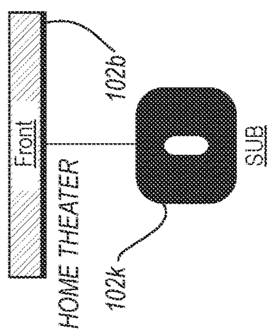
Figure 3D:
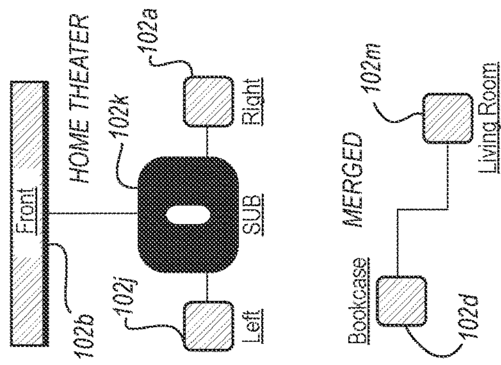
Figure 3E:
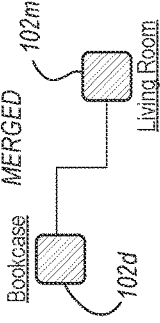
Figure 3A:
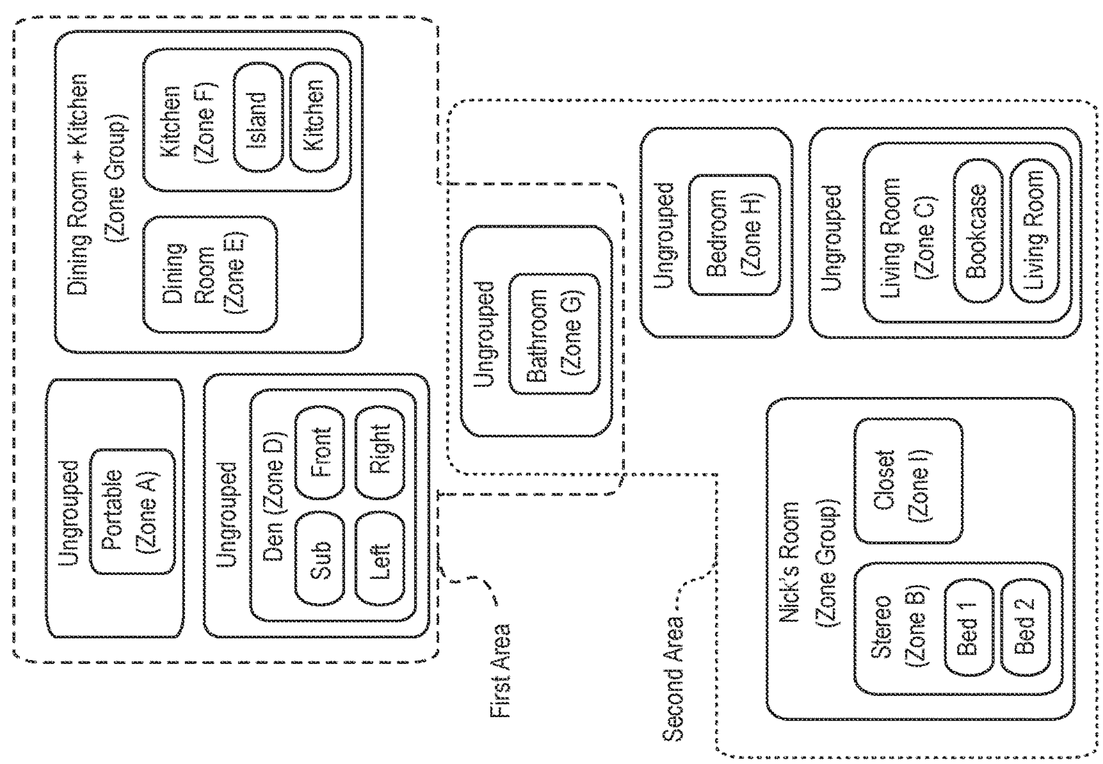

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair," which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone. For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440*a* and 440*b* shown in FIGS. 4B and 4C. Referring to FIGS. 4B and 4C together, the controller interfaces 440*a* and 440*b* includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figures 5, 6:
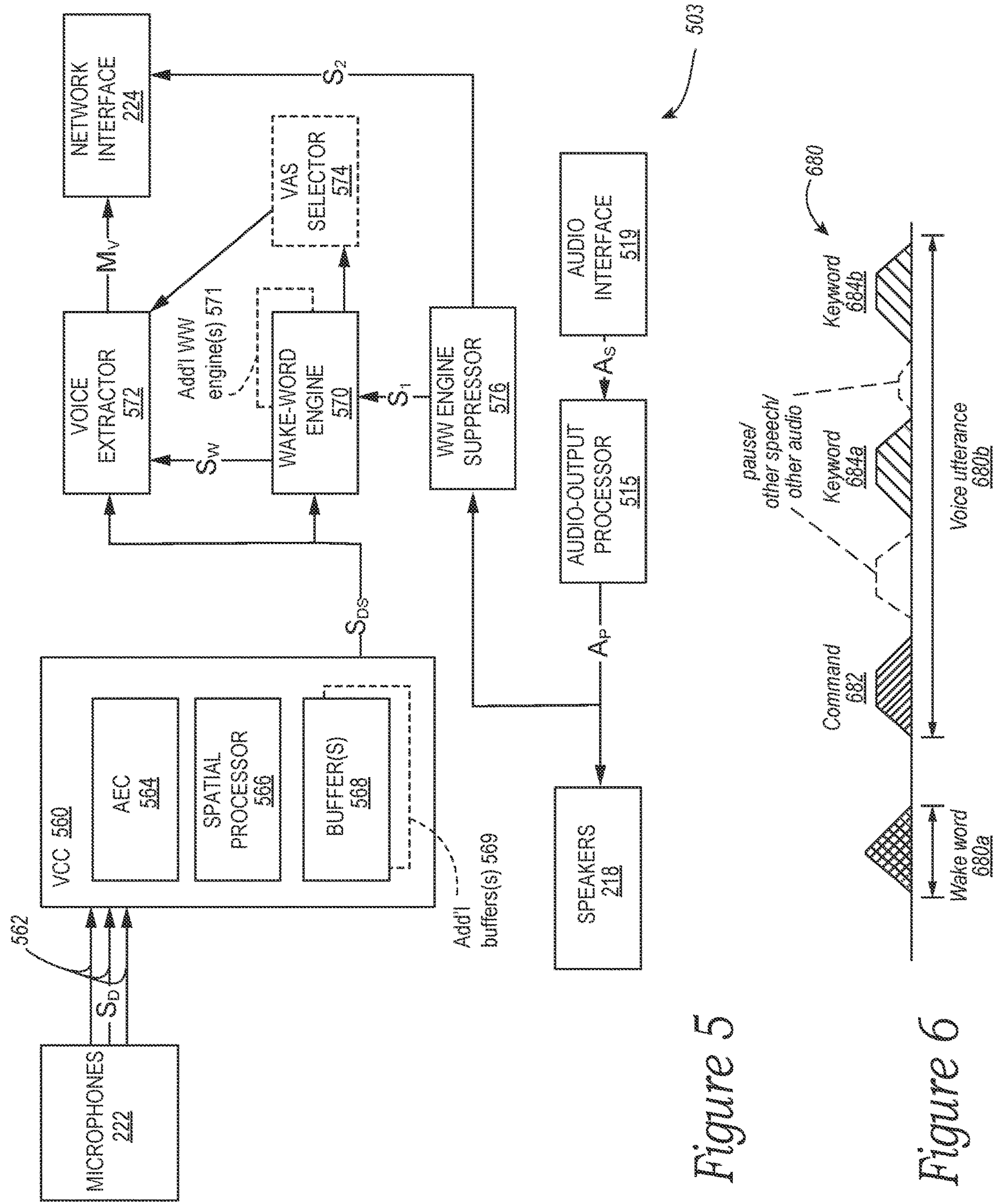
FIG. 5 is a functional block diagram of certain components of an example network microphone device in accordance with aspects of the disclosure.
FIG. 6 is a diagram of an example voice input in accordance with aspects of the disclosure.

FIG. 5 is a functional block diagram showing an NMD 503 configured in accordance with embodiments of the disclosure. The NMD 503 includes voice capture components ("VCC") 560, at least one wake-word engine 570 and voice extractor 572, each of which is operably coupled to the VCC 560, and a wake-word engine suppressor 576. The NMD 503 also includes audio output processing components 515 operably coupled to the wake-word engine suppressor 576 and the speakers 218, and the NMD 503 includes at least one audio input interface 519 operably coupled to the audio output processing components 515, both of which may form a portion of the audio processing components 216 discussed above. The NMD 503 further includes the microphones 222 and the at least one network interface 224 described above and may also include other components, such as audio amplifiers, a user interface, etc., which are not shown in FIG. 5 for purposes of clarity.

The microphones 222 of the NMD 503 are configured to provide detected sound, $S_D$, from the environment of the NMD 503 to the VCC 560. The detected sound $S_D$ may take the form of one or more analog or digital signals. In example implementations, the detected sound $S_D$ may be composed of a plurality signals associated with respective channels 562 that are fed to the VCC 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the VCC 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream AEC 564 and spatial processor 566.

In some implementations, the NMD 503 may include an additional buffer 569 (shown in dashed lines) that stores information (e.g., metadata or the like) regarding the detected sound $S_D$ that was processed by the upstream AEC 564 and spatial processor 566. This other buffer 569 may be referred to as a "sound metadata buffer." When the wake-word engine 570 identifies a wake-word trigger (discussed below), the sound metadata buffer 569 may pass to the network interface 224 sound characteristic information corresponding to the wake-word trigger (e.g., spectral and/or gain information of sound from the environment of the NMD and/or the voice input comprising the wake word). The network interface 224 may then provide this information to a remote server that may be associated with the MPS 100. In one aspect, the information stored in the additional buffer 569 does not reveal the content of any speech but instead is indicative of certain unique features of the detected sound itself. In a related aspect, the information may be communicated between computing devices, such as the various computing devices of the MPS 100, without implicating privacy concerns. In practice, the MPS 100 can use this information to adapt and fine-tune voice processing algorithms, including sensitivity tuning as discussed below.

In any event, the detected-sound data form a digital representation (i.e., sound-data stream), $S_{DS}$, of the sound detected by the microphones 222. In practice, the sound-data stream Sips may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 503 may process the sound-data stream $S_{DS}$. For instance, the wake-word engine 570 is configured to apply one or more identification algorithms to the sound-data stream $S_{DS}$ (e.g., streamed sound frames) to spot potential wake words in the detected-sound $S_D$. When the wake-word engine 570 spots a potential wake word, the work-word engine 570 provides an indication of a "wake-word event" (also referred to as a "wake-word trigger"). In the illustrated example of FIG. 5, the wake-word engine 570 outputs a signal, $S_W$, that indicates the occurrence of a wake-word event to the voice extractor 572.

In multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine (and a corresponding wake-word trigger), such as the wake-word engine 570 and at least one additional wake-word engine 571 (shown in dashed lines). In such implementations, the NMD 503 may include multiple, different wake-word engines and/or voice extractors, each supported by a particular VAS. Similar to the discussion above, each wake-word engine may be configured to receive as input the sound-data stream $S_{DS}$ from the one or more buffers 568 and apply identification algorithms to cause a wake-word trigger for the appropriate VAS. Thus, as one example, the wake-word engine 570 may be configured to identify the wake word "Alexa" and cause the NMD 503 to invoke the AMAZON VAS when "Alexa" is spotted. As another example, the wake-word engine 571 may be configured to identify the wake word "Ok, Google" and cause the NMD 503 to invoke the GOOGLE VAS when "Ok, Google" is spotted. In single-VAS implementations, the VAS selector 574 may be omitted.

In response to the wake-word event (e.g., in response to the signal $S_W$ indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages. The voice extractor 572 transmits or streams these messages, $M_V$, that may contain voice input in real time or near real time to a remote VAS, such as the VAS 190 (FIG. 1B), via the network interface 224.

The VAS is configured to process the sound-data stream $S_{DS}$ contained in the messages $M_V$ sent from the NMD 503. More specifically, the VAS is configured to identify voice input based on the sound-data stream $S_{DS}$. Referring to FIG. 6, a voice input 680 may include a wake-word portion 680*a* and an utterance portion 680*b*. The wake-word portion 680*a* corresponds to detected sound that caused the wake-word event. For instance, the wake-word portion 680*a* corresponds to detected sound that caused the wake-word engine 570 to output the wake-word event signal $S_W$ to the voice extractor 572. The utterance portion 680*b* corresponds to detected sound that potentially comprises a user request following the wake-word portion 680*a*.

Typically, the VAS may first process the wake-word portion 680*a* within the sound-data stream $S_{DS}$ to verify the presence of the wake word. In some instances, the VAS may determine that the wake-word portion 680*a* comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until it spots another potential wake word, leading to another wake-word event. In some implementations, the VAS may not process or receive the wake-word portion 680*a* but instead processes only the utterance portion 680*b*.

In any case, the VAS processes the utterance portion 680*b* to identify the presence of any words in the detected-sound data and to determine an underlying intent from these words. The words may correspond to a certain command and certain keywords 684 (identified individually in FIG. 6 as a first keyword 684*a* and a second keyword 684*b*). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680*b* may include additional information, such as detected pauses (e.g., periods of non-speech) between words spoken by a user, as shown in FIG. 6. The pauses may demarcate the locations of separate commands, keywords, or other information spoke by the user within the utterance portion 680*b*.

Based on certain command criteria, the VAS may take actions as a result of identifying one or more commands in the voice input, such as the command 682. Command criteria may be based on the inclusion of certain keywords within the voice input, among other possibilities. Additionally, or alternately, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 of the NMD 503 (FIG. 5) may resume or continue to monitor the sound-data stream $S_{DS}$ until it spots another potential wake-word, as discussed above.

Returning to FIG. 5, in general, the one or more identification algorithms that a particular wake-word engine, such as the wake-word engine 570, applies are configured to analyze certain characteristics of the detected sound stream $S_{DS}$ and compare those characteristics to corresponding characteristics of the particular wake-word engine's one or more particular wake words. For example, a particular wake-word engine 570 may apply one or more identification algorithms to spot spectral characteristics in the detected sound stream $S_{DS}$ that match the spectral characteristics of the engine's one or more wake words, and thereby determine that the detected sound $S_D$ comprises a voice input including a particular wake word.

In some implementations, the one or more identification algorithms may be third-party identification algorithms (i.e., developed by a company other than the company that provides the NMD 503). For instance, operators of a voice service (e.g., AMAZON) may make their respective algorithms (e.g., identification algorithms corresponding to AMAZON's ALEXA) available for use in third-party devices (e.g., NMDs 103), which are then trained to identify one or more wake words for the particular voice service. Additionally, or alternatively, the one or more identification algorithms may be first-party identification algorithms that are developed and trained to identify certain wake words that may not be particular to a given voice service. Other possibilities also exist.

In practice, a wake-word engine may include a sensitivity level setting that is modifiable. The sensitivity level may define a degree of similarity between a word identified in the detected sound stream $S_{DS}$ and the wake-word engine 570's one or more particular wake words that is considered to be a match (i.e., that triggers the NMD 503 to invoke the corresponding VAS). In other words, the sensitivity level defines how closely, as one example, the spectral characteristics in the detected sound stream $S_{DS}$ must match the spectral characteristics of the engine's one or more wake words to be a wake-word trigger.

In this respect, the sensitivity level generally controls how many false positives that the wake-word engine 570 identifies. For example, if a wake-word engine 570 is configured to identify the wake-word "Alexa" with a relatively high sensitivity, then false wake words of "Election" or "Lexus" would cause the wake-word engine 570 to flag the presence of the wake-word "Alexa." On the other hand, if this example wake-word engine 570 is configured with a relatively low sensitivity, then the false wake words of "Election" or "Lexus" would not cause the wake-word engine 570 to flag the presence of the wake-word "Alexa."

In practice, a sensitivity level may take a variety of forms. In example implementations, a sensitivity level takes the form of a confidence threshold that defines a minimum confidence (i.e., probability) level for a wake-word engine that serves as a dividing line between triggering or not triggering a wake-word event when the wake-word engine is analyzing detected sound for its particular wake word. In this regard, a higher sensitivity level corresponds to a lower confidence threshold (and more false positives), whereas a lower sensitivity level corresponds to a higher confidence threshold (and fewer false positives). For example, lowering a wake-word engine's confidence threshold configures it to trigger a wake-word event when it identifies words that have a lower likelihood that they are the actual particular wake word, whereas raising the confidence threshold configures the engine to trigger a wake-word event when it identifies words that have a higher likelihood that they are the actual particular wake word. Other examples of sensitivity levels are also possible.

In example implementations, sensitivity level parameters (e.g., the range of sensitivities) for a particular wake-word engine can be updated, which may occur in a variety of manners. As one possibility, a VAS or other third-party provider of a given wake-word engine may provide to the NMD 503 a wake-word engine update that modifies one or more sensitivity level parameters for the given wake-word engine.

As another possibility, a remote server associated with the MPS 100 may update (or define in the first instance) sensitivity level parameters for a given wake-word engine, which it may do periodically or aperiodically. In some such cases, the remote server may define or otherwise update sensitivity level parameters for wake-word engines based on data regarding characteristics of detected sound (e.g., spectral and/or gain characteristics) associated with past occurrences of wake-word triggers (i.e., identifications of the respective particular wake-words for the given engines). In practice, the remote server may receive such data from NMDs when wake-word triggers occur or from another source of wake-word related sound data (e.g., Internet databases or the like). In any case, the remote server may be configured to perform operations based on such data (e.g., train predictive models and/or run simulations) to determine sensitivity parameters for a given wake-word engine to balance false positives and true identifications of the particular wake word.

In example embodiments, a wake-word engine 570 may take a variety of forms. For example, a wake-word 570 may take the form of one or more modules that are stored in memory of the NMD 503 (e.g., the memory 213 of FIG. 2A). As another example, a wake-word engine 570 may take the form of a general-purpose or special-purpose processor, or a module thereof. In this respect, multiple wake-word engines 570 may be part of the same component of the NMD 503 or each wake-word engine may take the form of a component that is dedicated for the particular wake-word engine. Other possibilities also exist. If a wake-word engine 570 identifies the presence of a wake word in the detected sound stream $S_{DS}$, the wake-word trigger signal $S_W$ may be passed to the voice extractor 572 to begin extraction for processing voice input, as discussed above.

With reference still to FIG. 5, an NMD may be configured as a playback device that includes the at least one audio interface 519, as discussed above. The audio interface 519 is generally configured to receive audio in a variety of forms from a variety of sources (e.g., an analog music signal or digital data of an Internet podcast). In this regard, the audio interface 519 may take the form of an analog and/or digital line-in receptacle that physically connects the NMD 503 to an audio source and/or may take the form of, or otherwise leverage, the network interface 224 that receives audio data via a communication network. In any case, the audio interface 519 provides an audio stream, $A_S$, to the audio output processing components 515, which in turn process the audio stream $A_S$ prior to the NMD 503 outputting processed audio, $A_P$, via the speakers 218. In this respect, the audio output processing components 515 may be the same or similar to the audio processing components 218 discussed above.

The audio output processing components 515 may also output a processed audio stream $A_P$ to the wake-word engine suppressor 576. In general, the wake-word engine suppressor 576 is configured to identify within the processed audio stream $A_P$ a particular wake word, and other false wake words related thereto, for each of the wake-word engines 570, 571. In this respect, the wake-word engine suppressor 576 may perform this identification process to the audio stream in a manner similar to the wake-word identification process performed by the one or more primary wake-word engines 570-571, except that the wake-word engine suppressor 576 is configured to identify keywords in the path of the audio stream $A_S$ rather than the path of detected sound $S_D$.

In operation, the wake-word engine suppressor 576 may be tuned to be more sensitive at spotting false wake words than the primary wake-word engine(s) 570-571. For example, the wake-word engine suppressor 576 may be tuned with a lower confidence threshold than the respective confidence thresholds for the primary wake-word engine(s) 570-571. To illustrate, for example, for a primary wake word engine 570 configured to identify the wake word "Alexa," the wake-word engine suppressor 576 may be set to a relatively high sensitivity level to identify phonetically similar words, such as "Alexis," "Lexus," "Election," etc.

In any event, based on the wake-word engine suppressor 576 identifying a particular wake word (or a related false wake word) in the processed audio stream AP, the wake-word engine suppressor 576 may cause the NMD 503, and one or more other NMDs, to perform (or not perform) certain functions. The wake-word engine suppressor 576 is discussed in further detail below.

In some embodiments, one or more of the components described above can operate in conjunction with the microphones 222 to detect and store a user's voice profile, which may be associated with a user account of the MPS 100. In some embodiments, voice profiles may be stored as and/or compared to variables stored in a set of command information or data table. The voice profile may include aspects of the tone or frequency of a user's voice and/or other unique aspects of the user, such as those described in previously-referenced U.S. patent application Ser. No. 15/438,749.

In some embodiments, one or more of the components described above can operate in conjunction with the microphones 222 to determine the location of a user in the home environment and/or relative to a location of one or more of the NMDs 103. Techniques for determining the location or proximity of a user may include one or more techniques disclosed in previously-referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is herein incorporated by reference in its entirety.

In some embodiments, the MPS 100 is configured to temporarily reduce the volume of audio content that it is playing while identifying the wake word portion 680*a* of a voce input. For instance, the MPS 100 may restore the volume after processing the voice input 680. Such a process can be referred to as ducking, examples of which are disclosed in previously-referenced U.S. patent application Ser. No. 15/438,749.

III. Example Deactivation of Wake-Word Engines

As discussed above with reference to FIG. 5, the NMD 503 includes one or more wake-word engines 570-571, each of which is configured to apply one or more identification algorithms to received sound inputs to identify whether that sound comprises a voice input that includes a particular wake word for the given wake-word engine. If one of the wake-word engines identifies the presence of a wake word, then the wake-word engine triggers the voice extractor 572 to perform voice-capture related functions to prepare the sound-data stream $S_{DS}$ for the appropriate VAS.

As noted above, an NMD may expend a significant amount of compute resources when its wake-word engines are active (i.e., processing detected sound). Likewise, an NMD may expend additional computing resources when performing voice-capture related functions upon one of the wake-word engines identifying a wake word. Because of the compute-intensive nature of these functions, ideally, the NMD would only perform these functions in response to a person speaking the actual work word to the NMD. However, in practice, the wake-word engines typically are continuously active and are prone to detect false positives caused by "false wake words" that trigger the additional voice-capture functions. These false positives can occur in a variety of manners.

For example, a false positive can occur when the wake-word engine 570 identifies in detected sound that originates from audio output by the NMD 503 itself or a playback device in the vicinity of the NMD 503 a wake word that the engine is trained to spot. This scenario is considered a false positive—and the wake word in the audio is considered a false wake word—because the source of the wake word is the NMD 503 itself, or the nearby playback device, instead of a person speaking with the intention of invoking the voice service associated with the wake word. In this respect, as one example, when the audio of a commercial advertising AMAZON's ALEXA service is output in the vicinity of the NMD 503 with the wake-word engine 570 trained to spot "Alexa," the word "Alexa" spoken in the commercial is considered a false wake word.

As another example, a false positive can occur when the wake-word engine 570 identifies in detected sound that originates from audio output by the NMD 503 itself or a playback device in the vicinity of the NMD 503 a word that is phonetically similar to an actual wake word that the engine is trained to spot. In this regard, as one example, when the audio of a commercial advertising LEXUS automobiles is output in the vicinity of the NMD 503 with the wake-word engine 570 trained to spot "Alexa," the word "Lexus" spoken in the commercial is considered a false wake word. As another example, when the audio of a TV news coverage of an election is output in the vicinity of the NMD 503 with the wake-word engine 570 trained to spot "Alexa," the word "Election" spoken in that news coverage is considered a false wake word. Other examples of false wake words are also possible.

As discussed before, the occurrences of false positives are undesirable for a number of reasons. For example, an NMD prone to false positives can operate inefficiently in that false wake word triggers cause it to carry out compute-intensive voice-capture related functions. As another example, a false positive may cause an NMD to chime unexpectedly and startle anyone nearby the NMD. As yet another example, a false positive may also interrupt audio playback, which can diminish a listening experience.

Example devices, systems, and methods disclosed herein attempt to alleviate the aforementioned technical problems. In this regard, broadly speaking, a playback device (e.g., an NMD 503) is configured with a secondary wake-word engine that suppresses or otherwise temporarily deactivates one or more of the playback device's primary wake-word engines, as well as one or more other NMDs' wake-word engines, when the secondary wake-word engine determines that the playback device is about to playback audio that comprises a false wake word.

Figure 7:
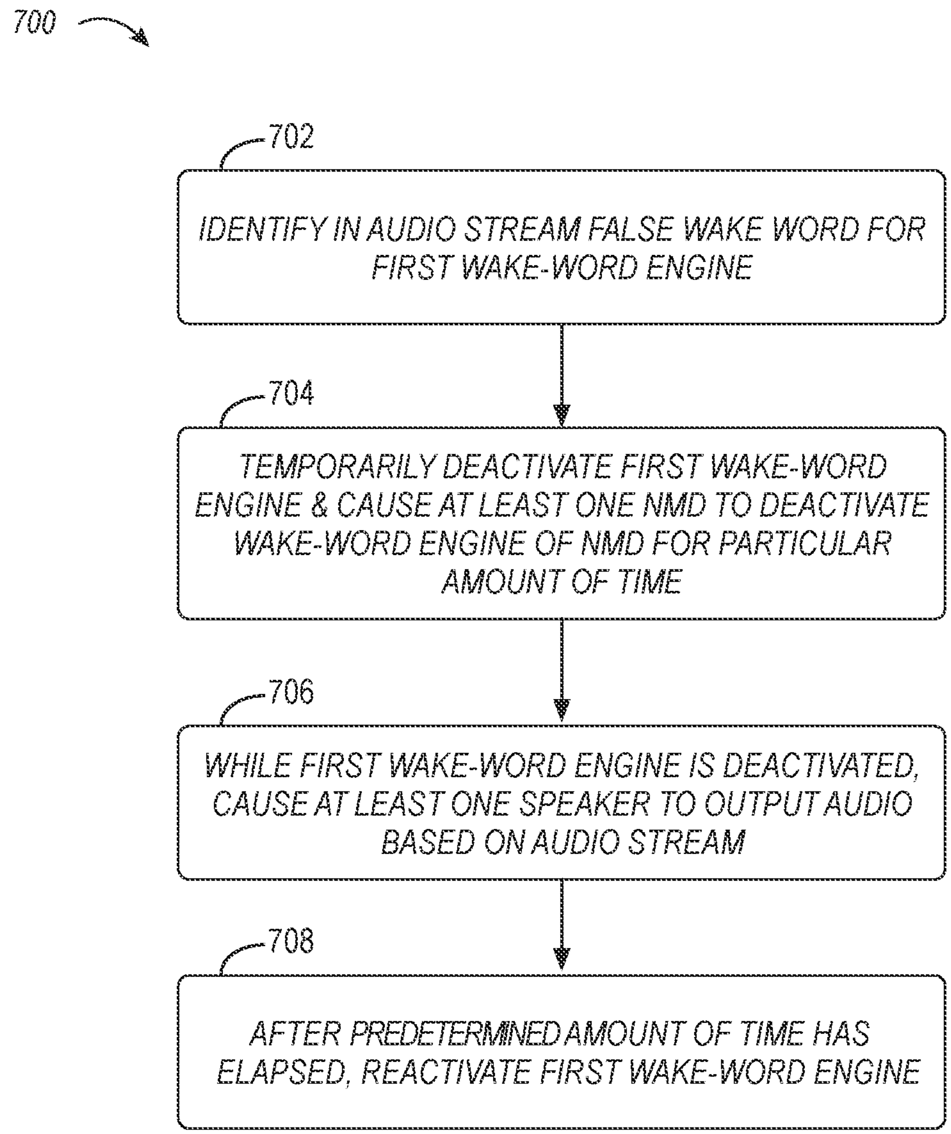
FIG. 7 is a flow diagram of an example method for deactivating wake-word engines in accordance with aspects of the disclosure.

For purposes of illustration only, an example method 700 for deactivating wake-word engines is depicted in FIG. 7 and discussed below as being carried out by a playback device of the MPS 100 that is NMD-equipped (e.g., the playback device 102*a*). It should be understood that the method 700 is exemplary. For instance, one or more blocks shown in the flow diagram of FIG. 7 may be rearranged into different orders, combined into fewer blocks, separated into additional blocks, and/or removed altogether. It should further be understood that the method 700 could be performed by a device other than a playback device of the MPS 100, which may be part of a different type of system.

In line with the above discussion, and with reference to FIG. 5, the playback device 102*a*, which is configured with components and functionality of an NMD 503, may include at least one speaker 218, at least one microphone 222, a first wake-word engine (e.g., at least one primary wake-word engine 570), and a second wake-word engine (e.g., the wake-word engine suppressor 576). The at least one primary wake-word engine 570 is configured to (i) receive as input sound data based on sound detected by the at least one microphone 222 (e.g., the sound-data stream $S_{DS}$) and (ii) identify the presence of at least one particular wake word therein (e.g., "Alexa") according to a first sensitivity level for false positives of the particular wake word. The wake-word engine suppressor 576 is configured to (i) receive as input an audio stream (e.g., the processed audio stream $A_P$) and (ii) identify the presence of at least the particular wake word therein according to a second sensitivity level for false positives of the particular wake word, where this second sensitivity level is more sensitive than the first sensitivity level. In this respect, the second sensitivity level may cause the wake-word engine suppressor 576 to identify more words that are phonetically similar to the particular wake word (e.g., "Lexus," "Alexis," "Election," etc.) compared to the primary wake-word engine 570. In some cases, the second sensitivity level may also accommodate a wider range of dialectical and speech pattern variations for the particular wake word compared to the primary wake-word engine 570.

Turning now to FIG. 7, at block 702, the playback device 102*a* identifies in an audio stream, via the wake-word engine suppressor 576, a false wake word for the at least one primary wake-word engine 570. In practice, the playback device 102*a* may receive the audio stream $A_S$ via the audio interface 519, which receives or otherwise obtains audio from an audio source. One example of the audio source is a TV, CD player, etc. that is physically connected to the audio interface 519 via an audio cable or the like. Another example of the audio source is a networked audio source (e.g., another playback device, a NAS, a WAN-based audio source, etc.) that is communicatively coupled to the playback device 102*a* via a network interface 224. Other examples are also possible.

In any event, the audio interface 519 provides the audio stream $A_S$ to the audio output processing components 515 that then process the audio stream $A_S$. The audio processing components 515 output the processed audio stream $A_P$ to the wake-word engine suppressor 576. The wake-word engine suppressor 576 receives from the audio output processing components 515 the processed audio stream $A_P$ and determines whether a false wake word for any of the primary wake-word engines 570 is present. In this respect, the wake-word engine suppressor 576 is configured to perform keyword spotting in a similar manner as any wake-word engine 570-571, except that the wake-word engine suppressor 576 is configured to perform keyword spotting in the path of the audio stream $A_S$ as opposed to the path of the detected sound $S_D$.

In some implementations, the wake-word engine suppressor 576 is configured to identify within the audio stream $A_S$ the particular wake word for each primary wake-word engine 570-571 and other false wake words related thereto. For instance, a first primary wake-word engine 570 may be configured to identify a first particular wake word and trigger voice capture in response to identifying the first particular wake word, and a second primary wake-word engine 571 may be configured to identify a second particular wake word and trigger voice capture in response to identifying the second particular wake word. The wake-word engine suppressor 576 may in turn be configured to identify within the audio stream $A_S$ the first and second particular wake words and other false wake words related thereto. In other implementations, the playback device 102*a* may include a wake-word engine suppressor for each primary wake-word engine 570 that is configured to only detect the particular wake word, and other false wake words related thereto, for the given primary wake-word engine.

In any event, the wake-word engine suppressor 576 may take the form of a wake-word engine (discussed above) that is configured to apply to the processed audio stream $A_P$ the one or more identification algorithms of the primary wake-word engine(s) 570-571 but at a sensitivity level that is higher than the sensitivity level of the primary wake-word engine(s) 570-571. In other words, the wake-word engine suppressor 576 is intentionally tuned, for each particular wake word, to identify more false positives than a given primary wake-word engine 570-571. In example implementations, the wake-word engine suppressor 576 is tuned such that an average amount of time that it suppresses a primary wake-word engine over a particular duration based on false positives does not exceed a set amount of time (e.g., five seconds per hour). Other examples of wake-word engine suppressors are also possible.

In some implementations, a remote server associated with the MPS 100 that is configured to store and process information corresponding to past wake-word triggers for a particular wake word (e.g., spectral and/or gain information for past voice inputs comprising the particular wake word) may send to the playback device 102*a* a message or the like that defines or otherwise updates the second sensitivity level based on such information from one or more NMDs. For instance, the playback device 102*a* may include a sound metadata buffer (such as the metadata buffer 569) configured to store information regarding characteristics of sound detected by the microphones 222, such as spectral and/or gain characteristics, and cause the playback device 102*a* to send this information to the remote server upon a wake-word trigger. $A_S$ such, at least in some instances, the second sensitivity level is defined based on information stored by the playback device 102*a*'s sound metadata buffer. Other NMDs may provide similar information to the remote server when they themselves determine that a wake-word trigger occurs.

Returning to the method 700 of FIG. 7, the wake-word engine suppressor 576 identifies in the audio stream $A_S$ a false wake word for the at least one primary wake-word engine 570. Based on that identification, at block 704, the playback device 102*a* (i) temporarily deactivates the at least one primary wake-word engine 570 and (ii) causes at least one NMD (e.g., one or more NMDs and/or one or more NDM-equipped playback devices) to deactivate a wake-word engine of the at least one NMD for a particular amount of time. These functions may be performed in a variety of manners.

For instance, the playback device 102*a* may temporarily deactivate the at least one primary wake-word engine 570 in different manners. As one possibility, the wake-word engine suppressor 576 may instruct the playback device 102*a*, or components thereof (e.g., the voice extractor 572 and/or the VAS selector 574), to ignore wake-word triggers output by the at least one primary wake-word engine 570 for a certain amount of time. For instance, the at least one primary wake-word engine 570 may continue to spot the particular wake word in detected sound, but any wake-word trigger signal $S_W$ output as a result would not cause the voice extractor 572 to perform the aforementioned voice-capture related functions. In this way, the at least one primary wake-word engine 570's output has been suppressed.

As another possibility, the wake-word engine suppressor 576 may send a suppression trigger $S_1$ to the at least one primary wake-word engine 570 instructing it not to indicate wake-word triggers for a certain amount of time. In other words, the wake-word engine suppressor 576 may instruct the at least one primary wake-word engine 570 to ignore identifications of the particular wake word for a certain amount of time. In response to this instruction, the at least one primary wake-word engine 570 may not output a wake-word trigger signal $S_W$ when it spots the particular wake word in the sound-data stream $S_{DS}$.

As yet another possibility, the wake-word engine suppressor 576 may send a suppression trigger $S_1$ to the at least one primary wake-word engine 570 instructing it to enter a standby state. In practice, such an instruction may cause the at least one primary wake-word engine 570 to become idle, thereby not analyzing the sound-data stream $S_{DS}$.

As yet a further possibility, the wake-word engine suppressor 576 may cause the at least one primary wake-word engine 570 to reduce the sensitivity level of the at least one primary wake-word engine 570 for a certain amount of time. In this way, the at least one primary wake-word engine 570 may still trigger wake-word events when it identifies a word that is highly likely an actual wake word but may not trigger wake-word events when it identifies a word with a relatively lower confidence that the word is indeed a wake word (e.g., a word phonetically similar to a particular wake word). Other possibilities also exist.

In any case, the at least one primary wake-word engine 570 may return to its normal state after a certain amount of time has expired and/or upon instruction from the wake-word engine suppressor 576, among other possibilities.

In some implementations, the wake-word engine suppressor 576's deactivation function may only affect the particular primary wake-word engine 570 that corresponds to the identified false wake word. For example, based on identifying the false wake word "Election" in the processed audio stream $A_P$, the wake-word engine suppressor 576 suppresses only the primary wake-word engine 570 tuned to identify the wake word "Alexa." In other implementations, the wake-word engine suppressor 576's deactivation function may affect each of the primary wake-word engines 570-571, to the extent that the playback device 102*a* includes multiple primary wake-word engines. In other words, identifying a false wake word for one primary wake-word engine 570 may result in the temporary deactivation of all primary wake-word engines 570-571. Other possibilities also exist.

Likewise, the playback device 102*a* may cause the at least one NMD to deactivate a wake-word engine of the at least one NMD for a particular amount of time in a variety of manners. As one example, the wake-word engine suppressor 576 may cause the playback device 102*a* to provide, via a local communication network, a deactivation message or indicator to the at least one NMD. In particular, the wake-word engine suppressor 576 may send a deactivation signal $S_2$ to the network interface(s) 224 that then transmit a corresponding message over the local communication network of the MPS 100 (e.g., LAN 111) causing the at least one NMD to deactivate for a particular amount of time its own wake-word engine that corresponds to the identified false wake word.

In some implementations, the playback device 102*a* may cause any NMD that is part of the MPS 100 to deactivate its wake-word engine corresponding to the identified false wake word, which the playback device 102*a* may do utilizing an identifier that is unique to the MPS 100 (e.g., a household identifier or the like). Additionally, or alternatively, the playback device 102*a* may cause any NMD that is connected to the same local communication network as the playback device 102*a* to deactivate its own wake-word engine, which it may do utilizing an SSID or the like associated with the local communication network.

In other implementations, the playback device 102*a* may be configured to selectively deactivate certain NMDs' wake-word engines, while leaving other NMDs' wake-word engines active. In other words, the playback device 102*a* may be configured to identify particular NMDs for deactivation from a plurality of possible NMDs. For example, the playback device 102*a* may be configured to cause each NMD that is within the playback device 102*a*'s zone group, bonded zone, merged set, and/or Area to temporarily deactivate its own wake-word engine corresponding to the identified false wake word. As another example, the playback device 102*a* may select for deactivation any NMD that is located within a certain proximity to the playback device 102*a*. Other examples are also possible.

Figure 8A:
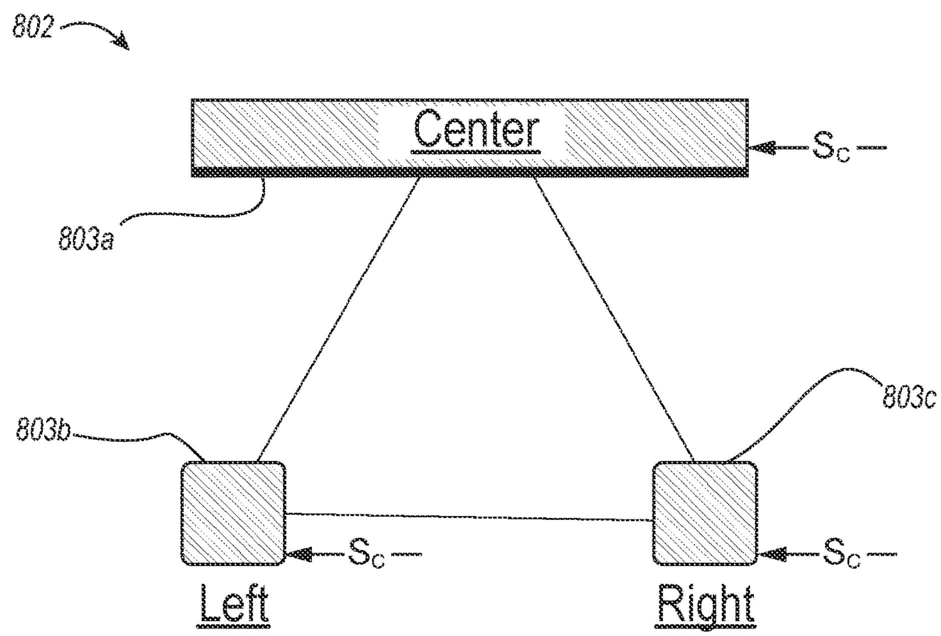
FIGS. 8A and 8B are schematic diagrams of example bonded playback devices and grouped playback devices in accordance with aspects of the disclosure.
Figure 8B:
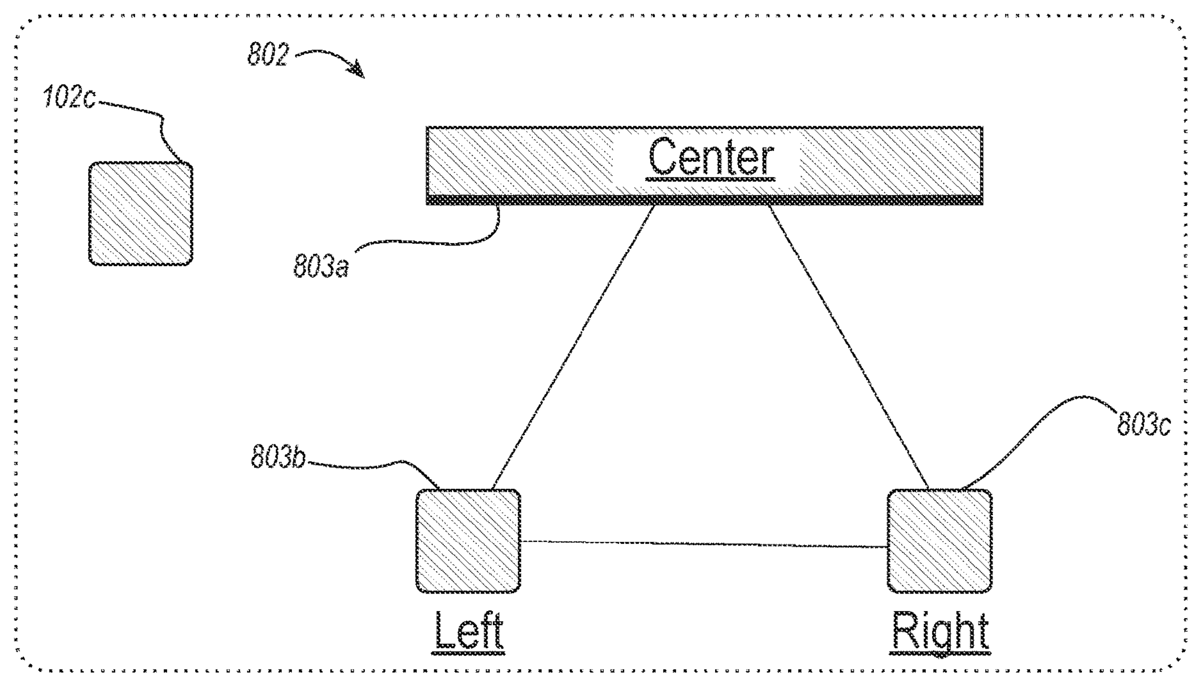

To illustrate, FIGS. 8A and 8B depict examples of a playback device selectively deactivating certain NMDs' wake-word engines. In particular, FIG. 8A shows a bonded configuration 802 comprising left, center, and right channel NMDs 803*a-c*, respectively, each of which is configured to transmit a deactivation signal $S_2$ (FIG. 5) to the other devices in the bonded configuration 802 when a false wake-word is spotted by a given one of the NMDs 803*a-c*. For example, the left channel NMD 803*b* can transmit a deactivation signal that causes the NMDs 803*a* and 803*c* to disable their respective wake-word engines.

FIG. 8B shows another example in which the bonded configuration 802 is grouped with the portable playback device 102*c* for synchronous playback. In example implementations, an additional selective deactivation function may be implemented due to the portable (i.e., battery-powered) nature of the playback device 102*c* and/or the nature of the configuration in which the portable playback device is part of (e.g., in a synchrony group configuration, in a synchrony group configuration with a bonded set, etc.). This additional selective deactivation of portable NMD's wake-word engines may help conserve portable playback device's battery power. In particular, when the portable playback device 102*c* is grouped with, for example, the bonded configuration 802 (or one of the NMDs 803*a-c*), a wake-word engine of the portable playback device 102*c* (and perhaps a wake-word engine suppressor of the portable playback device 102*c*) may be disabled so long as it remains in the group. In this way, the portable playback device 102*c* is caused to conserve its battery power that would otherwise be drawn by its wake-word engine(s). In operation, the portable playback device 102*c* may receive over its network interface a disable (or deactivation) message when grouped, bonded, etc., and likewise, it may receive an enable (or reactivation) message when ungrouped to (re)activate its wake-word engine(s). Other examples of selective deactivation of NMD's wake-word engines are also possible.

In practice, the particular amount of time for which the at least one NMD is to deactivate its wake-word engine corresponding to the identified false wake word may have a duration that is sufficient to allow the playback device 102*a* to output audio, via the speakers 218, that comprises the false wake word and/or to allow the NMD to receive a sound input comprising that output audio. This particular amount of time (i.e., "deactivation time") can be defined in a variety of manners and may be the same as or different from the deactivation time for the playback device 102*a*.

As one possibility, each NMD of the MPS 100 is configured to apply the same deactivation time (e.g., 100 milliseconds) for any identified false wake word. In such cases, the playback device 102*a* may include an indication of this particular amount of time in the deactivation message, or any device receiving a deactivation message may be preconfigured to utilize this particular amount of time.

As another possibility, the deactivation time may be dependent on the particular false wake word that was identified at block 702. For example, the playback device 102*a* may be configured to define the particular amount of time based on an evaluation of one or more characteristics of the identified false wake word, such as the length, number of syllables, number of vowels, etc., of the false wake word. In this respect, a deactivation time is generally longer in duration for a false wake word comprising numerous syllables, vowels, etc. compared to a deactivation time for a false wake word comprising fewer syllables, vowels, etc.

As yet another possibility, the deactivation time may be dependent on characteristics of the local communication network by which the playback device 102*a* communicates with the at least one NMD. For example, the deactivation time may be based on a measure of the network latency between the playback device 102*a* and the at least one NMD. In this way, the deactivation time of the at least one NMD may be defined to accommodate network latency in communications between the playback device 102*a* and the at least one NMD. In this regard, the deactivation time may change over time as the network latency improves or degrades. In other words, different iterations of the method 700 that involve defining the deactivation time based on characteristics of the local communication network may have different particular amounts of time. Other possibilities for the particular amount of time are also possible.

In any case, based on receiving the deactivation message, the at least one NMD may deactivate at least its own wake-word engine that is tuned to detect a wake word corresponding to the false wake word identified by the playback device 102*a*'s wake-word engine suppressor 576. The at least one NMD may so deactivate its applicable wake-word engine for an amount of time that may be specified in the deactivation message or predefined upon receiving a deactivation message. In practice, the at least one NMD deactivates its own wake-word engine in a manner similar to how the playback device 102*a* deactivated its primary wake-word engine 570. In this way, the playback device 102*a* causes the at least one NMD to deactivate a wake-word engine that would otherwise identify a false wake word trigger based on output audio originating from the playback device 102*a*.

At block 706 of FIG. 7, while the at least one primary wake-word engine 570 is deactivated (and the at least one NMD's wake-word engine is deactivated), the playback device 102*a* causes its speakers to output audio based on the audio stream. In other words, the playback device 102*a* plays back audio comprising the false wake word that was identified by the wake-word engine suppressor 576. For instance, the audio output processing components 515 provide the processed audio $A_P$ to the speakers 218, which in turn output audio based on the audio stream $A_S$.

By suppressing the at least one primary wake-word engine 570 corresponding to the identified false wake word prior to playing back the audio comprising the false wake word, the playback device 102*a* has proactively avoided a false positive that otherwise could have occurred. Likewise, the playback device 102*a* has caused the at least one NMD to do the same. In doing so, the playback device 102*a* has helped itself, as well as the at least one NMD, to prevent, or at least mitigate, wasting compute resources, interrupting audio playback, and/or outputting unexpected chiming that otherwise might be caused by the false positive.

At block 708, after a predetermined amount of time has elapsed, the playback device 102*a* may reactivate the at least one primary wake-word engine 570 that was deactivated at block 704. For instance, the one or more primary wake-word engines 570-571 that were previously deactivated are reactivated after the playback device 102*a* determines that an amount of time has elapsed that is equivalent to (i) its own deactivation time, (ii) the at least one NMD's deactivation time, or (iii) the maximum of the playback device 102*a*'s deactivation time and the at least one NMD's deactivation time, among other possibilities. Likewise, the at least one NMD reactivates its one or more own wake-word engines that it deactivated in response to receiving the deactivation message after the NMD's deactivation time has transpired. In some implementations, the playback device 102*a* may reactivate the at least one primary wake-word engine 570 after an amount of time has elapsed that differs from an amount of time that elapses that causes the at least one NMD to reactivate its own wake-word engine.

With the playback device 102a's primary wake-word engines 570 reactivated, the playback device 102a returns to analyzing sounds from its environment for voice inputs comprising wake words that the primary wake-word engines 570 are configured to identify. Likewise, the at least one NMD's wake-word engine(s) is reactivated allowing it to resume analyzing sounds for voice inputs comprising the applicable wake word.

In some embodiments, the at least one NMD may also include a wake-word engine suppressor that operates in a manner similar to that of the wake-word engine suppressor 576 of the playback device 102a. In this regard, the NMD may transmit a deactivation message to the playback device 102a causing it to deactivate at least one primary wake-word engine 570 when that NMD determines that it is about to output audio with a false wake word. However, in some embodiments, the at least one NMD may not include a wake-word engine suppressor or may not necessarily be running a wake-word engine suppressor, but as discussed above, may nevertheless benefit from the playback device 102a's wake-word engine suppressor 576's identification of a false wake word.

In some embodiments, the sensitivity level of the wake-word engine suppressor 576 of the NMD 503 may be based on audio-channel characteristics of the audio stream $A_S$ that the NMD 503 is responsible for outputting. For example, as noted above, a bonded configuration of playback devices may have NMD-equipped playback devices, each of which is responsible for outputting a particular channel of audio, such as left, right, or center audio channels. In accordance with example embodiments, these playback devices' respective wake-word engine suppressors may be tuned according to the particular channel the given playback device is responsible for outputting.

For instance, a center channel of audio may typically contain the majority of speech information that could lead to false positives, and so, the playback device responsible for outputting the center channel may have its wake-word engine suppressor tuned to a relatively higher sensitivity level than that of the wake-word engine suppressors of the other devices. To illustrate, returning to FIG. 8A, the center-channel NMD 803a's wake-word engine suppressor may be tuned to a higher sensitivity level than the left and right channel NMD 803b's and 803c's respective wake-word engine suppressors (which might be tuned to the same sensitivity levels).

In other implementations, the sensitivity level of the wake-word engine suppressors for the other NMD-equipped playback devices in the bonded configuration (e.g., the left and right channel NMDs 803b-c) may be set to the same, heightened sensitivity level, for example, as the center channel NMD's wake-word engine suppressor, even though the left and right channel devices may be less prone to trigger false positives due to the lower likelihood of speech information in these channels. Other examples are also possible.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method comprising: identifying in an audio stream, via a second wake-word engine of a playback device, a false wake word for a first wake-word engine that is configured to receive as input sound data based on sound detected by at least one microphone of the playback device, wherein the first wake-word engine is configured according to a first sensitivity level for false positives of a particular wake word, and wherein the second wake-word engine is configured according to a second sensitivity level for false positives of the particular wake word that is more sensitive than the first sensitivity level; based on identifying the false wake word, (i) deactivating the first wake-word engine and (ii) causing, via a network interface of the playback device, at least one network microphone device to deactivate a wake-word engine of the at least one network microphone device for a particular amount of time; while the first wake-word engine is deactivated, causing at least one speaker of the playback device to output audio based on the audio stream; and after a predetermined amount of time has elapsed, reactivating the first wake-word engine. Example 2: The method of Example 1, wherein the playback device comprises a buffer configured to store information regarding characteristics of sound detected by the at least one microphone, wherein the characteristics comprise one or more of spectral or gain characteristics, and wherein the second sensitivity level is defined based at least on the stored information. Example 3: The method of any one of Examples 1-2, wherein the first wake-word engine is configured to, while activated, trigger extraction of a first sound input received via the at least one microphone in response to identifying in the first sound input the particular wake word or the false wake word, and wherein the wake-word engine of the at least one network microphone device is configured to, while activated, trigger extraction of a second sound input received via a microphone of the at least one network microphone device in response to identifying in the second sound input the particular wake word or the false wake word. Example 4: The method of any one of Examples 1-3, wherein the particular amount of time is a first amount of time and the predetermined amount of time is a second amount of time that differs from the first amount of time, and wherein the method further comprises defining the first amount of time based on the identifying of the false wake word. Example 5: The method of any one of Examples 1-4, wherein causing the at least one network microphone device to deactivate the wake-word engine of the at least one network microphone device comprises identifying the at least one network microphone device for deactivation from a plurality of network microphone devices. Example 6: The method of any one of Examples 1-5, wherein the playback device further comprises a third wake-word engine configured to receive as input the sound data based on sound detected by the at least one microphone, wherein the particular wake word is a first particular wake word, and wherein: the first wake-word engine is configured to identify the first particular wake word in a sound input received via the at least one microphone and trigger voice extraction in response to identifying the first particular wake word; the third wake-word engine is configured to identify a second particular wake word in a sound input received via the at least one microphone and trigger voice extraction in response to identifying the second particular wake word; and the method further comprises deactivating both of the first and third wake-word engines based on identifying the false wake word. Example 7: The method of any one of Examples 1-6, wherein the playback device is a first playback device, and wherein the method further comprises: grouping the first playback device with at least a second playback device, wherein the grouped playback devices are configured to synchronously play back audio; and based on identifying the false wake word, causing, via the network interface, each playback device grouped with the first playback device to deactivate a respective wake-word engine for a given amount of time.

Example 8: A playback device comprising: a network interface; one or more processors; at least one microphone; at least one speaker configured to output audio based on an audio stream; a first wake-word engine configured to receive as input sound data based on sound detected by the at least one microphone, wherein the first wake-word engine is configured according to a first sensitivity level for false positives of a particular wake word; a second wake-word engine configured to receive as input the audio stream, wherein the second wake-word engine is configured according to a second sensitivity level for false positives of the particular wake word that is more sensitive than the first sensitivity level; and a tangible, non-transitory, computer-readable medium having instructions stored thereon that are executable by the one or more processors to cause the playback device to perform the functions of any one of Examples 1-7.

Example 9: A tangible, non-transitory, computer-readable medium having instructions stored thereon that are executable by one or more processors to cause a playback device to perform the functions of any one of Examples 1-7.

The invention claimed is:

1. A system comprising:

one or more processors;

at least one non-transitory computer-readable medium; and program instructions stored on the at least one non-transitory computer-readable medium that are executable by the one or more processors such that the system is configured to:

before a second playback device that is part of a group with at least a first playback device identifies a wake-word via at least one microphone of the second playback device, determine that the second playback device should not respond to the identified wake-word;

based on determining that the second playback device should not respond to the identified wake-word, cause the second playback device, but not the first playback device, to temporarily deactivate wake-word response output for the wake-word;

while the second playback device's wake-word response output for the wake-word is temporarily deactivated, determine that the second playback device has identified, via the at least one microphone of the second playback device, the wake-word; and after the second playback device has identified the wake-word while the second playback device's wake-word response output for the wake-word is temporarily deactivated, cause the second playback device to reactivate wake-word response output for the wake-word.

2. The system of claim 1, wherein the program instructions stored on the at least one non-transitory computer-readable medium that are executable by the one or more processors such that the system is configured to cause the second playback device to temporarily deactivate wake-word response output comprise program instructions stored on the at least one non-transitory computer-readable medium that are executable by the one or more processors such that the first playback device is configured to:

transmit a signal instructing the second playback device to deactivate wake-word response output.

3. The system of claim 1, wherein the program instructions stored on the at least one non-transitory computer-readable medium that are executable by the one or more processors such that the system is configured to cause the second playback device to temporarily deactivate wake-word response output for the wake-word comprise program instructions stored on the at least one non-transitory computer-readable medium that are executable by the one or more processors such that the system is configured to:

cause the second playback device to deactivate wake-word response output for the wake-word while the second playback device is part of the group with the first playback device.

4. The system of claim 1, wherein the program instructions stored on the at least one non-transitory computer-readable medium that are executable by the one or more processors such that the system is configured to cause the second playback device to temporarily deactivate wake-word response output for the wake-word comprise program instructions stored on the at least one non-transitory computer-readable medium that are executable by the one or more processors such that the system is configured to:

cause the second playback device to suppress output of a response based on the identified wake-word.

5. The system of claim 1, wherein the program instructions stored on the at least one non-transitory computer-readable medium that are executable by the one or more processors such that the system is configured to determine that the second playback device should not respond to the identified wake-word comprise program instructions stored on the at least one non-transitory computer-readable medium that are executable by the one or more processors such that the system is configured to:

determine that the identified wake-word will be a false positive.

6. The system of claim 1, wherein the program instructions stored on the at least one non-transitory computer-readable medium that are executable by the one or more processors such that the system is configured to cause the second playback device to reactivate wake-word response output for the wake-word comprise program instructions stored on the at least one non-transitory computer-readable medium that are executable by the one or more processors such that the system is configured to:

cause the second playback device to reactivate wake-word response output for the wake-word after a period of time has elapsed.

7. The system of claim 6, further comprising program instructions stored on the at least one non-transitory computer-readable medium that are executable by the one or more processors such that the system is configured to:

after the period of time has elapsed, cause the second playback device to leave the group.

8. The system of claim 1, wherein the wake-word identified via the at least one microphone of the second playback device comprises audio that is phonetically similar to the wake-word.

9. The system of claim 1, wherein the program instructions stored on the at least one non-transitory computer-readable medium that are executable by the one or more processors such that the system is configured to determine that the second playback device has identified the wake-word comprise program instructions stored on the at least one non-transitory computer-readable medium that are executable by the one or more processors such that the system is configured to:

determine that the second playback device has identified the wake-word within audio content that is being played back by one or both of the first or second playback devices.

10. The system of claim 9, wherein the wake-word identified via the at least one microphone of the second playback device comprises spectral characteristics that match the spectral characteristics of the wake-word.

11. At least one non-transitory computer-readable medium, wherein the at least one non-transitory computer-readable medium is provisioned with program instructions that, when executed by one or more processors, cause a system to:

before a second playback device that is part of a group with at least a first playback device identifies a wake-word via at least one microphone of the second playback device, determine that the second playback device should not respond to the identified wake-word;

based on determining that the second playback device should not respond to the identified wake-word, cause the second playback device, but not the first playback device, to temporarily deactivate wake-word response output for the wake-word;

while the second playback device's wake-word response output for the wake-word is temporarily deactivated, determine that the second playback device has identified, via the at least one microphone of the second playback device, the wake-word; and after the second playback device has identified the wake-word while the second playback device's wake-word response output for the wake-word is temporarily deactivated, cause the second playback device to reactivate wake-word response output for the wake-word.

12. The at least one non-transitory computer-readable medium of claim 11, wherein the program instructions that, when executed by one or more processors, cause the system to cause the second playback device to temporarily deactivate wake-word response output comprise program instructions that, when executed by one or more processors, cause the system to:

transmit a signal instructing the second playback device to deactivate wake-word response output.

13. The at least one non-transitory computer-readable medium of claim 11, wherein the program instructions that, when executed by one or more processors, cause the system to cause the second playback device to temporarily deactivate wake-word response output comprise program instructions that, when executed by one or more processors, cause the system to:

cause the second playback device to deactivate wake-word response output for the wake-word while the second playback device is part of the group with the first playback device.

14. The at least one non-transitory computer-readable medium of claim 11, wherein the program instructions that, when executed by one or more processors, cause the system to cause the second playback device to temporarily deactivate wake-word response output comprise program instructions that, when executed by one or more processors, cause the system to:

cause the second playback device to suppress output of a response based on the identified wake-word.

15. The at least one non-transitory computer-readable medium of claim 11, wherein the program instructions that, when executed by one or more processors, cause the system to determine that the second playback device should not respond to the identified wake-word comprise program instructions that, when executed by one or more processors, cause the system to:

determine that the identified wake-word will be a false positive.

16. A method carried out by a system, the method comprising:

before a second playback device that is part of a group with at least a first playback device identifies a wake-word via at least one microphone of the second playback device, determining that the second playback device should not respond to the identified wake-word;

based on determining that the second playback device should not respond to the identified wake-word, causing the second playback device, but not the first playback device, to temporarily deactivate wake-word response output for the wake-word;

while the second playback device's wake-word response output for the wake-word is temporarily deactivated, determining that the second playback device has identified, via the at least one microphone of the second playback device, the wake-word; and after the second playback device has identified the wake-word while the second playback device's wake-word response output for the wake-word is temporarily deactivated, causing the second playback device to reactivate wake-word response output for the wake-word.

17. The method of claim 16, wherein causing the system to cause the second playback device to temporarily deactivate wake-word response output comprises:

transmitting a signal instructing the second playback device to deactivate wake-word response output.

18. The method of claim 16, wherein causing the system to cause the second playback device to temporarily deactivate wake-word response output comprises:

causing the second playback device to deactivate wake-word response output for the wake-word while the second playback device is part of the group with the first playback device.

19. The method of claim 16, wherein causing the system to cause the second playback device to temporarily deactivate wake-word response output comprises:

causing the second playback device to suppress output of a response based on the identified wake-word.

20. The method of claim 16, wherein causing the system to determine that the second playback device should not respond to the identified wake-word comprises:

determining that the identified wake-word will be a false positive.

* * * * *